(12) United States Patent
Scully et al.

(10) Patent No.: US 10,994,921 B2
(45) Date of Patent: May 4, 2021

(54) APPARATUS AND METHOD FOR STORING AND DISPENSING AN ITEM OF FOOD

(71) Applicant: Cutter Jacks, LLC, Dunstable, MA (US)

(72) Inventors: Linda T. Scully, Dunstable, MA (US); Joseph R. Carapezza, Westborough, MA (US)

(73) Assignee: Cutter Jacks, LLC, Dunstable, MA (US)

(*) Notice: Subject to any disclaimer, the term of this patent is extended or adjusted under 35 U.S.C. 154(b) by 0 days.

(21) Appl. No.: 16/361,337

(22) Filed: Mar. 22, 2019

(65) Prior Publication Data
US 2019/0291944 A1 Sep. 26, 2019

Related U.S. Application Data

(60) Provisional application No. 62/646,860, filed on Mar. 22, 2018.

(51) Int. Cl.
| | |
|---|---|
| *B65D 83/08* | (2006.01) |
| *B65D 81/34* | (2006.01) |
| *B65D 43/16* | (2006.01) |
| *B65D 83/00* | (2006.01) |

(52) U.S. Cl.
CPC ....... *B65D 83/0841* (2013.01); *B65D 43/165* (2013.01); *B65D 81/34* (2013.01); *B65D 83/0022* (2013.01); *B65D 2583/085* (2013.01)

(58) Field of Classification Search
CPC ............ B65D 83/0841; B65D 83/0022; B65D 2583/085; B65D 43/165; B65D 81/34; B65D 85/74; B65D 85/76; A01J 23/00; A01J 27/04

USPC .......................................... 30/115, 116, 117
See application file for complete search history.

(56) References Cited

U.S. PATENT DOCUMENTS

| | | | | |
|---|---|---|---|---|
| 1,348,805 | A | * | 8/1920 | Kaskouras .............. A01J 23/00 53/519 |
| 1,360,572 | A | * | 11/1920 | Palmer .................... A01J 23/00 83/257 |
| 2,274,621 | A | | 2/1942 | Wahlstrom et al. |
| 2,356,179 | A | | 8/1944 | Proudman et al. |
| 2,723,454 | A | * | 11/1955 | Janossy ................... A01J 23/00 83/437.5 |
| 2,737,721 | A | | 3/1956 | Hart |

(Continued)

OTHER PUBLICATIONS

International Search Report—International Application No. PCT/US19/023530 dated Jun. 7, 2019, together with the Written Opinion of the International Searching Authority, 17 pages.

*Primary Examiner* — Hwei-Siu C Payer
(74) *Attorney, Agent, or Firm* — Sunstein LLP

(57) ABSTRACT

A food storage and dispensing device includes a food holder configured to contain a sliceable item of food on the support surface and between the side walls. The food holder has a dispensing opening located at the first end. The device further includes a lid moveably mounted over the food holder so as to have an open position and a closed position and an end cap, having an upper edge coupled to the lid at a location proximate to the first end. The end cap is oriented to cover the dispensing opening when the lid is in the closed position and has a lower edge opposite the upper edge, the lower edge configured to slice the sliceable item of food when the lid is moved from the open position to the closed position.

6 Claims, 11 Drawing Sheets

(56) References Cited

U.S. PATENT DOCUMENTS

| | | | | |
|---|---|---|---|---|
| 2,813,336 | A | * | 11/1957 | Ackerman ............... B26D 1/25 30/115 |
| 3,920,156 | A | * | 11/1975 | Hicks ................... A47G 19/183 222/80 |
| 4,513,501 | A | | 4/1985 | Lee |
| 4,697,488 | A | * | 10/1987 | Cole ..................... B26D 1/547 30/116 |
| 5,621,972 | A | | 4/1997 | Sala |
| 2019/0291944 | A1 | * | 9/2019 | Scully ................... B65D 85/74 |

* cited by examiner

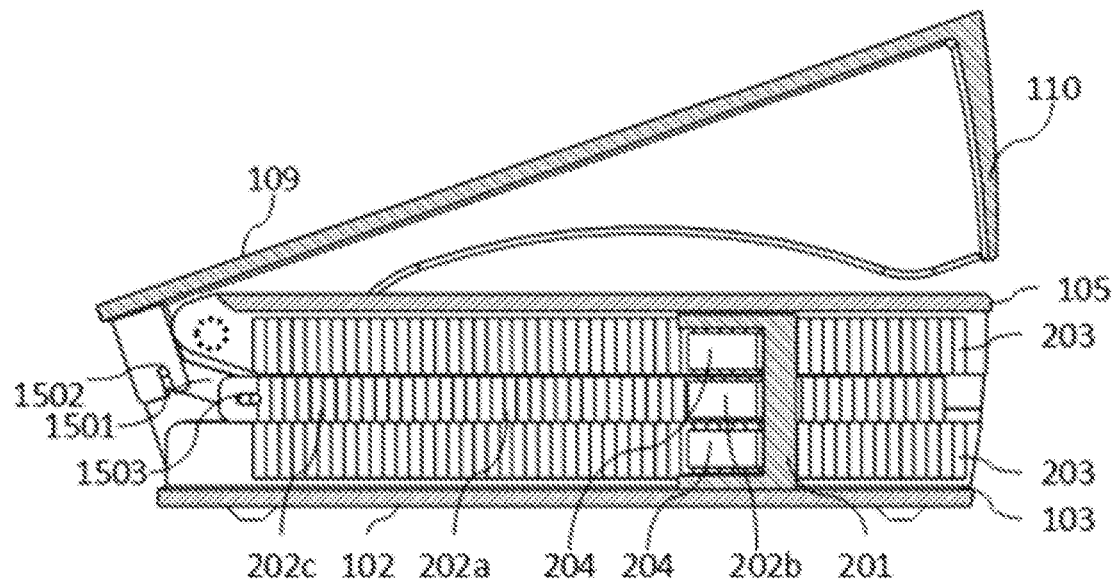
FIG. 15
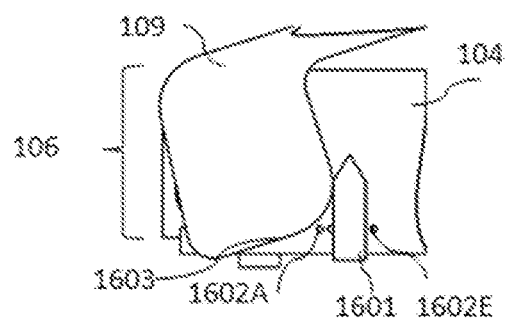 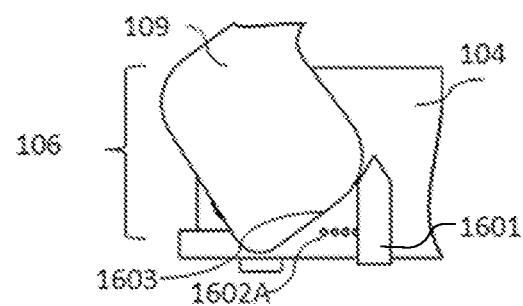
FIG. 16A  FIG. 16B

APPARATUS AND METHOD FOR STORING AND DISPENSING AN ITEM OF FOOD

RELATION TO PRIOR APPLICATIONS

The present application claims priority from U.S. Provisional Application Ser. No. 62/646,860 filed Mar. 22, 2018, which is incorporated herein by reference.

TECHNICAL FIELD

The present invention relates to food storage devices, and more particularly to such food storage devices that provide a means for dispensing and measuring the stored food.

BACKGROUND ART

It is known in the prior art that food storage devices usually include a storage section and a cover, and have a primary function of keeping food fresh and preventing contamination. Typically when one desires to use food stored in such containers, the cover is opened and action is taken to remove the food from the storage chamber either by picking it up with one's hands or utilizing a utensil such as a spoon or a knife. If the food is one solid piece and only a portion of the food is desired then one might also use one's hands or the utensil to separate the desired portion from the main body of food. Once the food is removed it then needs to be brought to the desired location either by hand or by balancing the desired portion of food on the utensil used to separate it or utilizing an additional utensil more suitable for transport from the container to a serving plate. Then to continue to store and protect the remainder of food the cover is placed back upon the container or in some cases left open for future dispensing of additional food since placing the cover on and off each time may be considered tedious, especially in cases when multiple portions are desired over a given period of time.

Assemblies of this sort have a number of disadvantages, including the amount of time it takes to dispense the food, since dispensing the food is a multi-step process. The chamber first must be opened and often the chamber or its cover placed down to free one's hand for use in later separating the desired portion. Then the hands are, or the utensil is, engaged to select and/or cut the desired food portion. Then the desired food portion must be transferred to the desired location and finally the chamber closed again for storage. In this way each step takes some amount of time and together sums up to a significant amount of time.

Another drawback of the above method is cleanliness. First, the serving element, whether it is a utensil or hand, gets dirty from being in contact with the food. Second, the stored food may get contaminated by dirt or food that is previously present on the hand or utensil that is used to dispense the desired food portion. This is especially common in situations where many people are dispensing foods like butter or cheese from the same storage device in a gathering. It is also common when food must be spread on the surface of another food such as bread or potatoes and more than one slice is desired.

Another drawback is difficulty in transport. When food needs to be cut with a knife it can be difficult to transfer that food from the storage chamber to the desired location without it falling from the knife. It is common for food to fall during the act of transferring the food from the storage chamber to its desired location, such as a plate, and when it falls the food is frequently wasted or contaminated and the surface it falls upon becomes dirty.

Another drawback is that getting a desired or consistent amount of food dispensed is up to the skill of the operator, and it is not uncommon for people to end up with more or less dispensed food then they intended. This is especially true with people who have less experience choosing a portion size like children, those who have challenges controlling their movements like the elderly or those who are distracted in conversation or other activities when serving themselves. Also those who are vision impaired have difficulty distinguishing where their cutting utensil contacts the food product. Those who are fully blind can only tell they have obtained a serving through touching the product.

Another drawback is that when multiple servings are desired the chamber is often left open to avoid the tedious action of opening and closing the chamber each time. This open chamber reduces the level of protection of the stored food, exposing it to air and temperature. In the case foods like cheese this can cause them to harden and in the case of foods like butter this can cause them to soften in an undesirable way.

It is likewise known in prior art that there are an additional set of approaches that attempt to integrate the storage and dispensing of food. These include devices that smash or deform the food or use a combination of coil springs, rotary gears or other fragile and complex components to manipulate the food. These devices and methods share many of the same drawbacks as the traditional methods as well as some additional issues that include:

Disfigurement of the dispensed food: Often such devices require that the food be compressed into various forms upon serving through implements that smash, melt or smear food. This reduces the visual enjoyment of the dispensed food as well as causes a change in density and texture that changes the perceived taste.

Complexity of components: The operating mechanisms of many such devices entail integration of complex components that often include small inaccessible spaces are hard to clean and therefore risk food contamination over time and difficulties in cleaning. Such complexity also contributes to excess cost to manufacture and greater likelihood of component failure.

Arduous operation: In addition many integrated solutions require arduous operation to obtain the desired amount of food, some even requiring careful placement of a movable component to get a desired size. Such devices can be frustrating to operate. Others do not provide any ability to vary the size of the dispensed food, making it useless in all instances where a different size is desired.

Large size: Many devices require complex configurations requiring them to be significantly larger than the food they store. As a result they are cumbersome to hold and take up additional valued space when stored in refrigerators or on tables.

Unknown quantity: Many of these devices do not contain a means for knowing the quantity dispensed and if they do their means are typically subject to user error, requiring calculations or detailed positioning of the size indicator. For foods like butter this is particularly undesirable since often the slice required can be smaller than a tenth of an inch and therefore hard to set manually.

Unfamiliar Configuration: Many existing approaches require components that look and function in a manner not consistent with expectations for dinnerware. This lack of visual appeal makes them unsuitable for using as part of an aesthetic table setting.

SUMMARY OF THE EMBODIMENTS

In one embodiment of the invention, there is provided a food storage and dispensing device. In this embodiment, the device has a food holder having (i) a bottom that includes a longitudinally disposed support surface, (ii) a pair of opposed side walls coupled to the bottom, and (iii) first and second ends, the holder configured to contain a sliceable item of food on the support surface and between the side walls. The food holder has a dispensing opening located at the first end. The device further includes a lid moveably mounted over the food holder so as to have an open position and a closed position and an end cap, having an upper edge coupled to the lid at a location proximate to the first end. The end cap is oriented to cover the dispensing opening when the lid is in the closed position and has a lower edge opposite the upper edge, the lower edge configured to slice the sliceable item of food when the lid is moved from the open position to the closed position. The device further includes an advancer, slideably mounted in the food holder to move longitudinally along the food holder, and configured to engage against the sliceable item of food; and a ratchet advance mechanism, coupled to the lid and to the advancer, and configured to incrementally move the advancer, and consequently the sliceable item of food, towards the dispensing opening each time the lid is moved to the open position from the closed position.

In a related embodiment, the ratchet advance mechanism includes a movable toothed rack coupled to the lid, longitudinally disposed in the food holder, and a first pawl disposed on the advancer, the movable toothed rack positioned to engage against the first pawl, the lid configured to advance the movable toothed rack and the advancer toward the dispensing opening when the lid is moved to the open position from the closed position, and to retract the movable toothed rack from the dispensing opening when the lid is moved to the closed position.

Optionally, the ratchet mechanism further comprises a stationary toothed rack, longitudinally disposed in the food holder, and a second pawl disposed on the advancer, the stationary toothed rack configured to restrain the advancer from motion when the lid is moved to the closed position and to permit motion of the advancer when the lid is moved to the open position.

Optionally, the second pawl is the same pawl as the first pawl, and the stationary toothed rack and the movable toothed rack are mounted so that both racks engage with the first pawl.

In another related embodiment, the ratchet advance mechanism is configured to act upon the advancer after the end cap has moved past the dispensing opening.

In yet another related embodiment, the device further includes an increment adjuster, mounted to occupy any of a plurality of distinct positions on a member selected from the group consisting of the lid, the food holder, and the movable toothed rack, wherein each position of the increment adjuster causes an interruption in the path of motion of the lid, as the lid is moved from the closed to the open position, by a different incremental amount so as to regulate advance of the sliceable item of food through the dispensing opening and therefore thickness of a resulting slice.

In another related embodiment, a member, selected from the group consisting of the movable toothed rack and the stationary toothed rack and a combination thereof, in a cross sectional view orthogonal to the longitudinal axis, is bowed toward the sliceable item of food so as to create a compressive force orthogonal to the longitudinal axis on the sliceable item of food to reduce a risk that the sliceable item of food would fall out of the food holder.

BRIEF DESCRIPTION OF THE DRAWINGS

The foregoing features of embodiments will be more readily understood by reference to the following detailed description, taken with reference to the accompanying drawings, in which:

FIG. 15 is a cut away perspective view of the embodiment shown in FIG. 14 with the lid in a closed position.

FIG. 16A and FIG. 16B are close up isometric views of the embodiment of FIG. 1 showing the increment adjuster placed in two unique positions on the food holder and interrupting the path of motion of the lid.

DETAILED DESCRIPTION OF SPECIFIC EMBODIMENTS

Definitions

As used in this description and the accompanying claims, the following terms shall have the meanings indicated, unless the context otherwise requires: A "food holder" is a vessel that can store an item of food. It can fully encase the food or consist of only enough structure to facilitate the necessary features for the assembly. It may have a square, rectangular, round, oval or other polygon shape.

The terms "upper," "lower," and "longitudinal" are intended as relative terms and are used for convenience in explaining orientation of components relative to one another in embodiments of the invention, and are not intended to indicate absolute orientations relative to gravity.

A "wall" is any surface, flat or curved, that is longitudinal aligned with the length of the food holder.

A "sliceable item of food" is any edible food item that is solid or semi-solid including but not limited to butter, cheese, baked goods, candy and vegetables.

"Within" is a location that is contained and is to include both interior and exterior locations.

Figure 1:
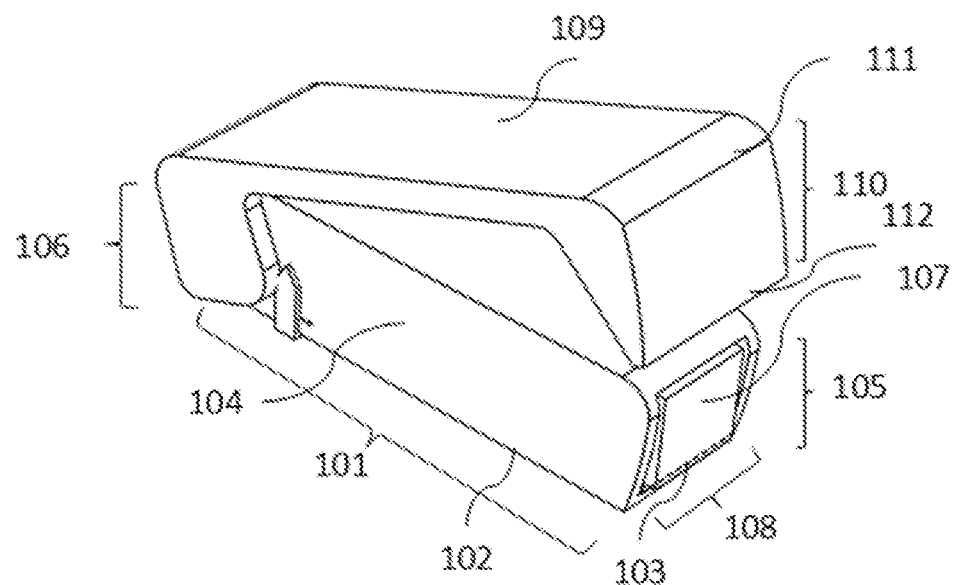
FIG. 1 is a perspective view of a first embodiment of the present invention with the lid in an open position and containing a sliceable item of food.

FIG. 1 is a perspective view of a first embodiment of the present invention with the lid 109 in an open position and containing a sliceable item of food 107. In this embodiment there is a food holder 101, having (i) a bottom 102 that includes a longitudinally disposed support surface 103, (ii) a pair of opposed side walls 104 coupled to the bottom 102, and (iii) a first end 105 and second end 106. The food holder 101 is configured to contain a sliceable item of food 107 on the support surface 103 and between the side walls 104; a dispensing opening 108 is located at the first end 105 of the food holder 101. Coupled to food holder 101 is the lid 109. In this embodiment, the lid 109 is rotatably mounted over the food holder 101, and it has an open position and a closed position; an end cap 110 having an upper edge 111 is coupled to the lid 109 at a location proximate to the first end 105, the end cap 110 oriented to cover the dispensing opening 108 when the lid 109 is in the closed position. The end cap 110 further has a lower edge 112 opposite the upper edge 111, the lower edge 112 configured to slice the sliceable item of food 107 when the lid 109 is moved from the open position to the closed position. Components of this and other embodiments may be made of any suitable material. Suitable materials may be polymeric, composite polymeric, ceramic, metal or other materials that have sufficient rigidity and flexibility to perform the requirements described herein.

Figure 2:
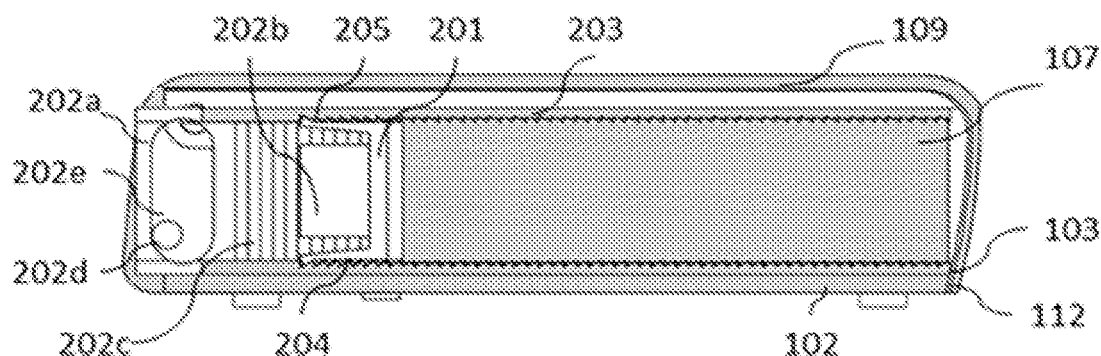
FIG. 2 is a cross sectional side view of the embodiment of FIG. 1 with the lid in a closed position.

FIG. 2 is a cross sectional side view of the embodiment of FIG. 1 with the lid 109 in the closed position. This figure further shows an advancer 201 slideably mounted in the food holder 101 to move longitudinally along the food holder 101, and configured to engage against the sliceable item of food 107. Also depicted is a ratchet advance mechanism 202a-e, coupled to the lid 109 and to the advancer 201, and configured to incrementally move the advancer 201, and consequently the sliceable item of food 107, towards the dispensing opening 108 each time the lid 109 is moved to the open position from the closed position. In this embodiment, the ratchet advance mechanism 202a-e comprises a moveable toothed rack 202a coupled to the lid 109, longitudinally disposed in the food holder 101, and a first pawl 202b disposed on the advancer 201, the moveable toothed rack 202a positioned to engage against the first pawl 202b. The lid 109 is configured to advance the moveable toothed rack 202a and the advancer 201 toward the dispensing opening 108 when the lid 109 is moved to the open position from the closed position, and to retract the moveable toothed rack 202a from the dispensing opening 108 when the lid 109 is moved to the closed position. The embodiment further comprises a stationary toothed rack 203, longitudinally disposed in the food holder 101, and a second pawl 204 disposed on the advancer 201, the stationary toothed rack 203 configured to restrain the advancer 201 from motion when the lid 109 is moved to the closed position and to permit motion of the advancer 201 with the moveable toothed rack 202a when the lid 109 is moved to the open position. The stationary toothed rack 203 may have a plurality of teeth 205. In this embodiment there further is a rotary joint (not shown) for coupling the lid 109 to the food holder 101 and a lid peg 202d and rack slot 202e for coupling the lid 109 to the moveable toothed rack 202a in the ratchet advance mechanism 202a-e. In this particular embodiment, the ratchet advance mechanism 202a-e includes two moveable toothed racks 202a located along each sidewall, two stationary toothed racks 203 located along the top and bottom walls, and two first pawls 202b and two second pawls 204 located on the advancer 201. The redundancy of many of the components in this embodiment provides a means for creating equal and opposing off axis forces to enable smoother motion; however, in alternative embodiments one of each component may be used or more than two of each component may be used.

Figure 3:
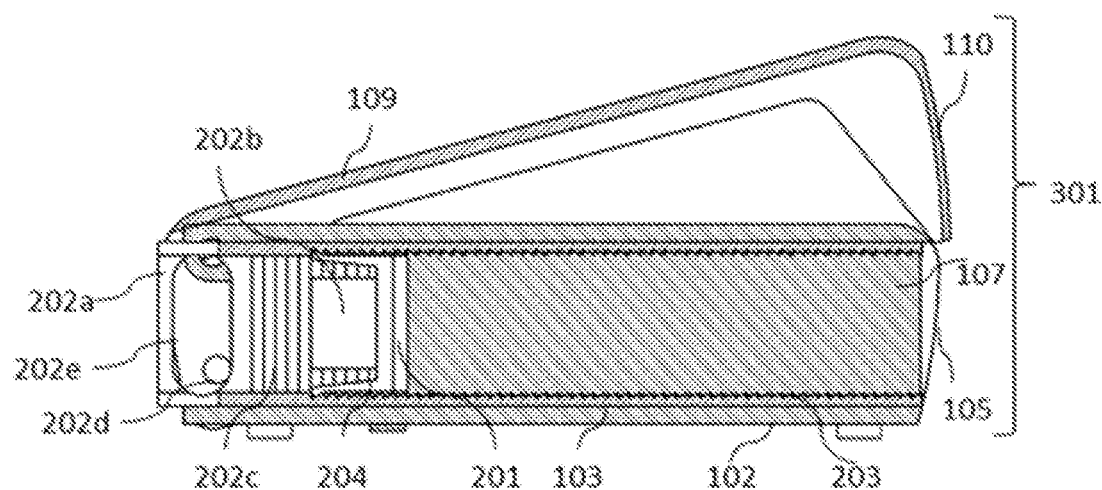
FIG. 3 is a cross sectional side view of the embodiment of FIG. 1 with the lid in a first open position.

FIG. 3 is a cross sectional side view of the embodiment of FIG. 1 with the lid 109 in a first open position 301. When the lid 109 is moved to the first open position 301, the lid pegs 202d located on the lid 109 come in contact with the rack slots 202e located on the moveable toothed rack 202a of the ratchet advance mechanism 202a-e. The width of the rack slots 202e is sufficiently wide so as to delay the transfer of motion from the lid pegs 202d on the lid 109 to the rack slots 202e on the moveable toothed rack 202a until the end cap 110 is sufficiently lifted past the position where it covers the dispensing opening 108. In this way, when the sliceable item of food 107 is advanced by the advancer 201, it can move freely through the dispensing opening 108.

Figure 4:
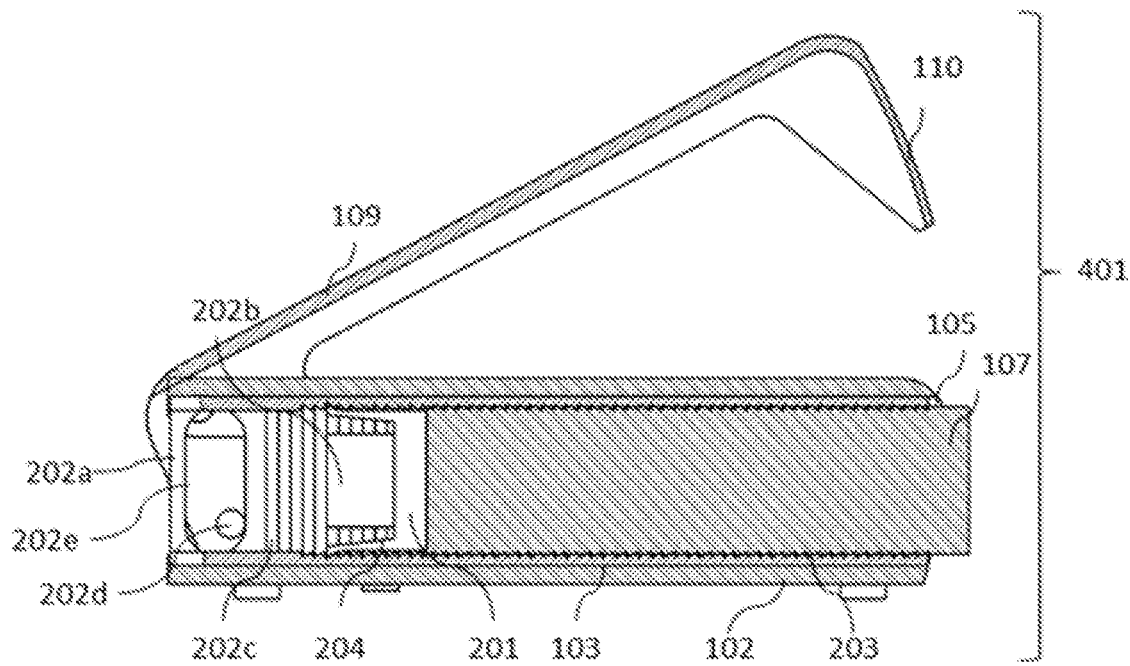
FIG. 4 is a cross sectional side view of the embodiment of FIG. 1 with the lid in a second open position.

FIG. 4 is a cross sectional side view of the embodiment of FIG. 1 with the lid 109 in a second open position 401. In this position the lid pegs 202d engage with a rack slot 202e on the moveable toothed rack 202a, and a tooth on the moveable toothed rack 202a engages with the first pawl 202b on the advancer 201, together the ratchet engagement mechanism. This action advances the advancer 201 which then advances a predetermined portion of the sliceable item of food 107 forward past the dispensing opening 108. For example, the second open position 401 may advance the advancer 201 the length of two teeth of the stationary toothed rack 203, each having a teeth spacing of 0.10 inches, for a total of 0.20 inches. The sliceable item of food 107 may be a 1.25" square cross section block, so that the portion of the sliceable item of food 107 advanced through the dispensing opening 108 may represent one teaspoon. This amount will be dispensed if the lid 109 is now closed. The portion of the sliceable item of food 107 advanced past the dispensing opening 108 is directly relatable to the amount the lid 109 is opened as the motion transferred through the ratchet engagement mechanism is directly relatable to the number of teeth of the stationary toothed rack 203 passed by the first pawl 202b on the advancer 201.

Figure 5:
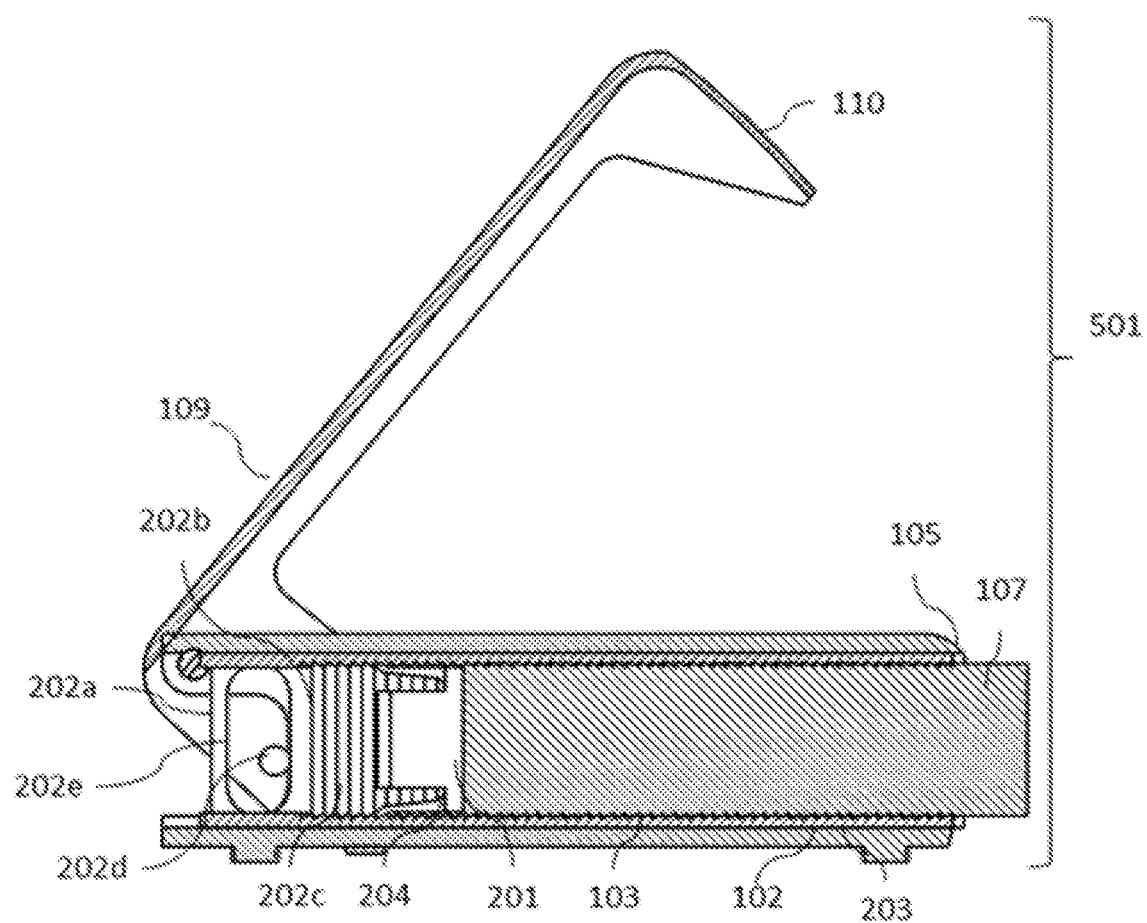
FIG. 5 is a cross sectional side view of the embodiment of FIG. 1 with the lid in a third open position.

FIG. 5 is a cross sectional side view of a first embodiment with the lid 109 in a third open position 501. In this position the additional motion of the lid 109 pushes on the lid pegs 202d further towards the dispensing opening 108 which pushes further on the rack slot 202e of the moveable toothed rack 202a which then transfers additional motion of the moveable toothed rack 202a through the first pawl 202b to the advancer 201. The advancer 201 then moves a greater predetermined portion of the sliceable item of food 107 forward past the dispensing opening 108. For example, in this embodiment the third open position 501 may advance the advancer 201 a total distance of six teeth 205 of the stationary toothed rack from the closed position, each tooth being spaced 0.10 inches apart. The sliceable item of food 107 may have a 1.25" square cross section block so that the portion of the sliceable item of food 107 advanced through the dispensing opening 108 may represents one tablespoon. This amount will be dispensed if the lid 109 is now closed.

Figure 6A:
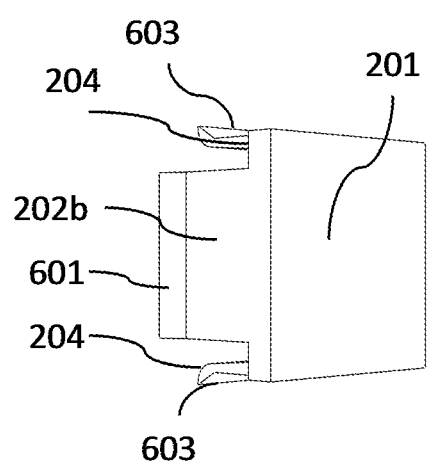
FIG. 6A and FIG. 6B are isometric views of the advancer of the embodiment of FIG. 1 showing two opposing first pawls and two opposing second pawls.
Figure 6B:
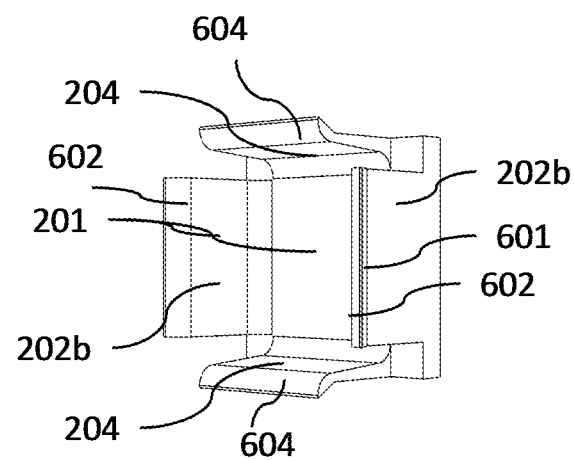

FIG. 6A and FIG. 6B show isometric views of the advancer 201 of the embodiment of FIG. 1 showing two opposing first pawls 202b and two opposing second pawls 204. While the embodiment may also have one or a greater number of pawls, two are exemplarily used to equalize the resultant off axis forces as the advancer 201 moves along the longitudinal axis of the food holder 101. Each first pawl 202b has a leading edge 601 and a trailing edge 602. Each second pawl 204 has a leading edge 603 and a trailing edge 604. The leading edges 601 and 603 have a slant to slideably disengage with the edge of a tooth 205 of the stationary toothed rack 203 and a tooth 202c of the moveable toothed rack 202a, allowing the advancer 201 to move freely past the teeth of the stationary and moveable toothed racks in the forward direction. The trailing edges 602 and 604 have an orthogonal component that engages with the tooth 205 of the stationary toothed rack 203 and the tooth 202c of the moveable toothed rack 202a, enabling the transfer of motion.

Figure 7:
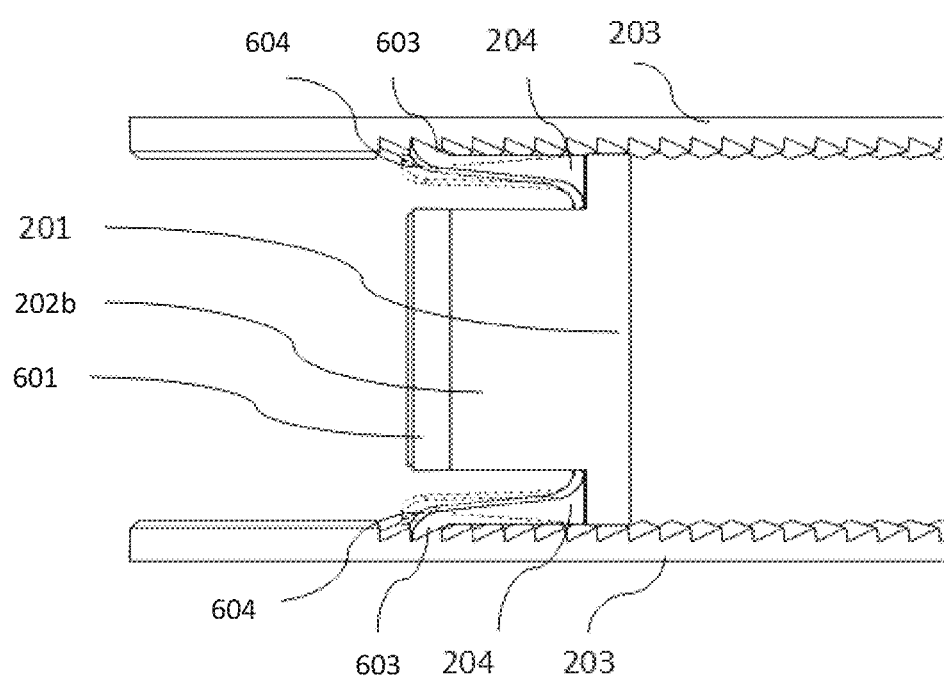
FIG. 7 is a side view of the advancer of FIG. 6 showing the flexure of the two second pawls that occurs as they move past the two stationary toothed racks upon the forward movement of the advancer.

FIG. 7 is a side view of the advancer 201 of FIG. 6 showing the flexure of the two second pawls 204 that occurs as they move past the two stationary toothed racks 203 upon the forward movement of the advancer 201.

Figure 8:
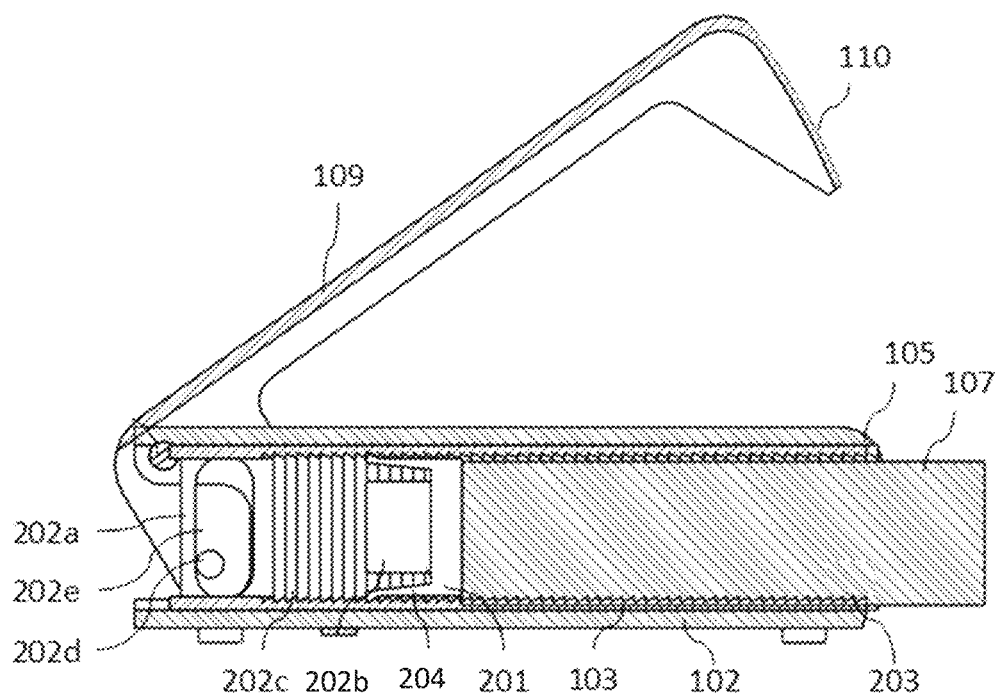
FIG. 8 is a cross sectional side view of the embodiment of FIG. 1 showing the lid moving from an open position to a partially closed position.

FIG. 8 is a cross sectional side view of the embodiment of FIG. 1 showing the lid 109 moving from an open position to a partially closed position. As the lid 109 is moved towards the partially closed position, the motion of the lid 109 moves the lid pegs 202d back to the position where they engage the rack slots 202e on the moveable toothed racks 202a so that the moveable toothed racks 202s pull back to their original position as the lid 109 is fully closed. Engagement of the second pawls 204 located on the advancer 201 with a tooth 205 (as depicted in FIG. 2) located on each of the stationary toothed racks 203 affixed to the walls of the food holder 101 prevent rearward motion of the advancer 201 as the moveable toothed racks 202a are pulled rearward.

Figure 9:
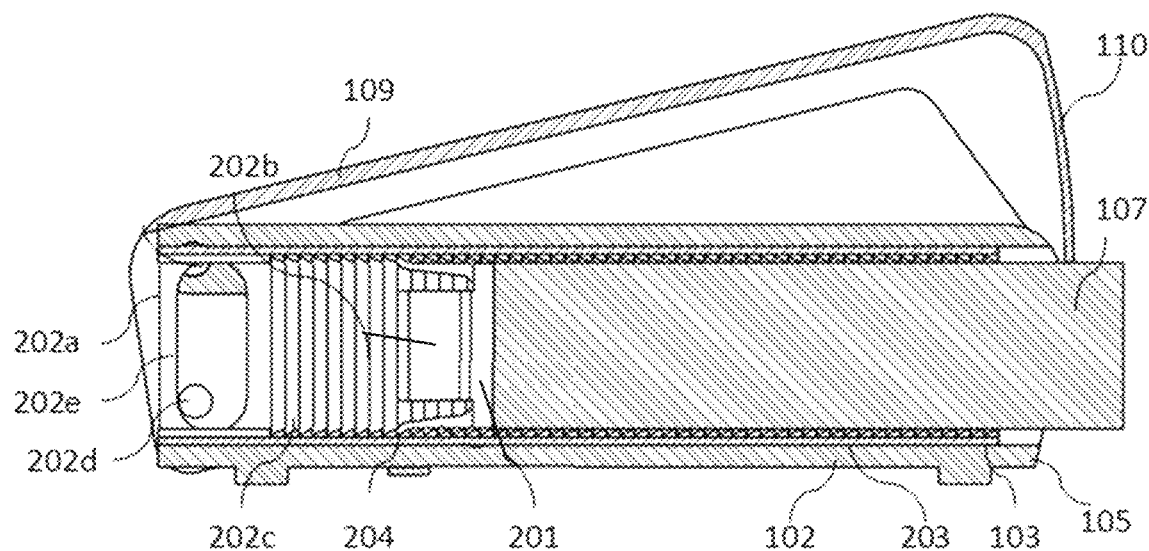
FIG. 9 is a cross sectional side view of the embodiment of FIG. 1 showing the lower edge of the lid contacting the advanced portion of the sliceable item of food as the lid moves towards the closed position.

FIG. 9 is a cross sectional side view of the embodiment of FIG. 1 showing the lower edge 112 of the end cap 110 contacting the advanced portion of the sliceable item of food 107 as the lid 109 moves towards the closed position. This figure shows how further moving the lid 109 towards the closed position engages the lid pegs 202d with the rack slots 202e located on the moveable toothed racks 202a. The lower edge 112 of the end cap 110 is brought in contact with the sliceable item of food 107 and begins to separate the portion that was advanced out the dispensing opening 108 from the sliceable item of food 107 that remains in the food holder 101.

Figure 10A:
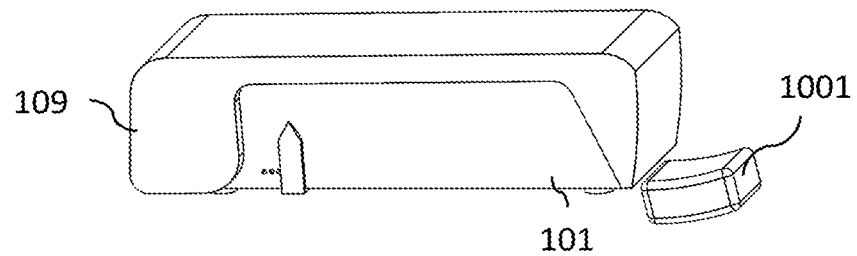
FIG. 10A and FIG. 10B are isometric views of the embodiment of FIG. 1 with the lid in a closed position after slicing and dispensing a tablespoon (FIG. 10A) and teaspoon (FIG. 10B) portion of dispensed food.
Figure 10B:
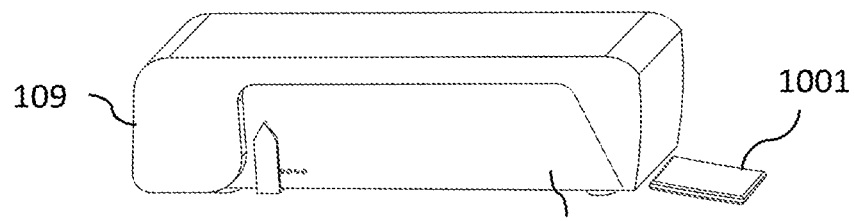

FIG. 10A and FIG. 10B are isometric views of the embodiment of FIG. 1 with the lid 109 in a closed position after slicing and dispensing a tablespoon (FIG. 10A) and teaspoon (FIG. 10B) portion of dispensed food 1001. The lower edge 112 of the end cap 110 slices through the sliceable item of food 107. Because there is a significant moment arm around the pivot point of the lid 109, even foods that are hard such as cucumbers and celery can easily be sliced by a dull and relatively weak material like three-dimensionally printed polylactide plastic. Upon returning to the closed position, the embodiment is now in position to operate again to dispense the next portion of the stored sliceable item of food 107. After the sliceable item of food 107 is fully dispensed, the advancer 201 is advanced through the dispensing opening 108 by opening and closing the lid 109 until the advancer 201 is moved sufficiently forward to be completely removed from the food holder 101. A new sliceable item of food 107 can now be placed in the food holder 101 and the advancer 201 placed in an opening in the first end 106 and pushed forward sufficiently to engage upon the sliceable item of food 107. Once this is done the embodiment is ready to operate once again in the same manner as described above.

Figure 11:
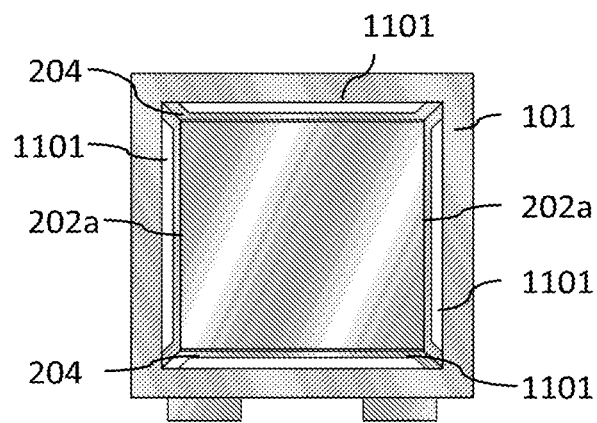
FIG. 11 is a perspective view of alternative component configurations of the embodiment of FIG. 1 with the stationary toothed racks and moveable toothed racks bowed toward the sliceable item of food so as to create a compressive force orthogonal to the longitudinal axis on the sliceable item of food

FIG. 11 is a perspective view of alternative component configurations of the embodiment of FIG. 1 with the stationary toothed racks 203 and moveable toothed racks 202a bowed toward the sliceable item of food 107 so as to create a compressive force orthogonal to the longitudinal axis on the sliceable item of food 107. This reduces a risk that the sliceable item of food 107 would fall out of the food holder 101. While this shows one potential embodiment, other embodiments include bowing a portion of the static toothed rack 203 or bowing the moveable toothed rack 202a or any combination of these configurations. The flexibility of the material along with the selected geometry allows a specific holding force to be defined.

In addition, the air gaps 1101 created by bowing the moveable toothed racks 202a and the stationary toothed racks 203 serve to provide additional insulation for the sliceable item of food 107. The air gaps 1101 serve to provide insulation for allowing the temperature of the sliceable item of food 107 to stay at a consistent temperature upon removal from cold or hot storage.

Figure 12:
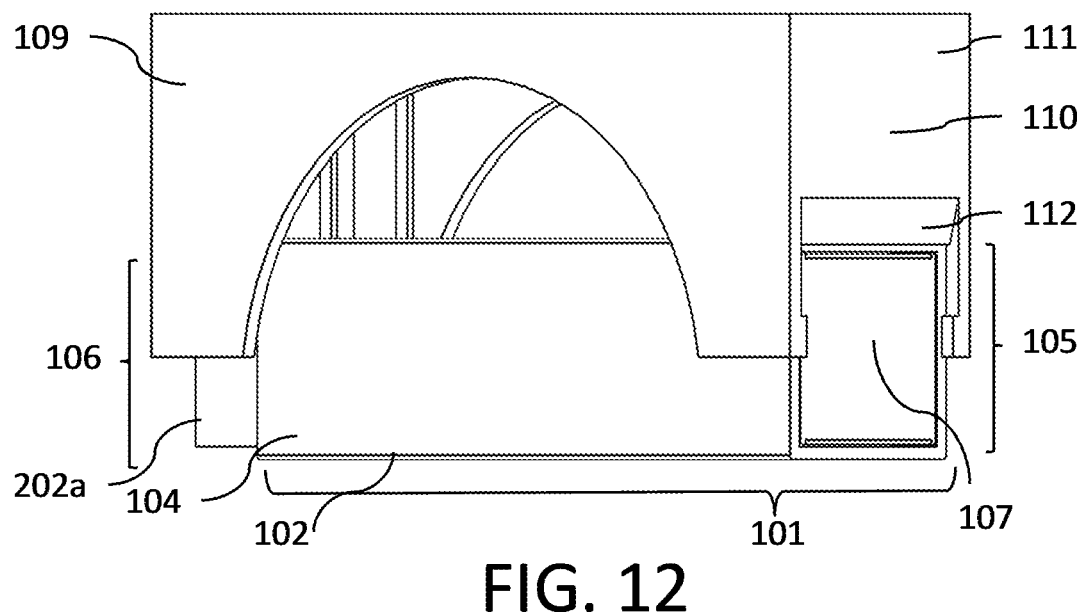
FIG. 12 is a perspective view of a second embodiment of the present invention with the lid in an open position where the lid moves in a largely horizontal motion.

FIG. 12 is a perspective view of a second embodiment of the present invention with the lid 109 in an open position where the lid 109 moves in a largely horizontal motion. In this embodiment an upward motion is used to lift the lid 109 and open the food holder 101 to act upon the ratchet advance mechanism 202a-e. This moves the sliceable item of food 107 forward toward the first end 105 of the food holder 101. Then, a downward motion is used to close the lid 109 and engage the lower edge 112 of the end cap 110 with the sliceable item of food 107 to cut and dispense it from the food holder 101.

Figure 13:
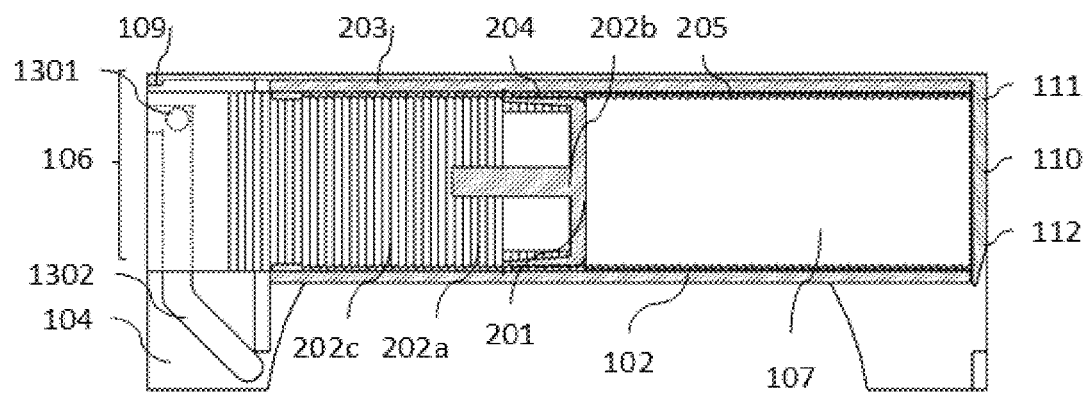
FIG. 13 is a cut away perspective view of the embodiment shown in FIG. 12 with the lid in a closed position.

FIG. 13 is a cut away perspective view of the embodiment shown in FIG. 12 with the lid 109 in the closed position. In this embodiment, the ratchet advance mechanism 202a-e includes a rack peg 1301 located on the moveable toothed rack 202a and a lid channel 1302 located on the inner surface of the lid 109 as well as the first pawl 202b located on the advancer 201. Lifting the lid 109 higher creates additional motion that then advances a greater portion of the sliceable item of food 107 through the dispensing opening 108.

Figure 14:
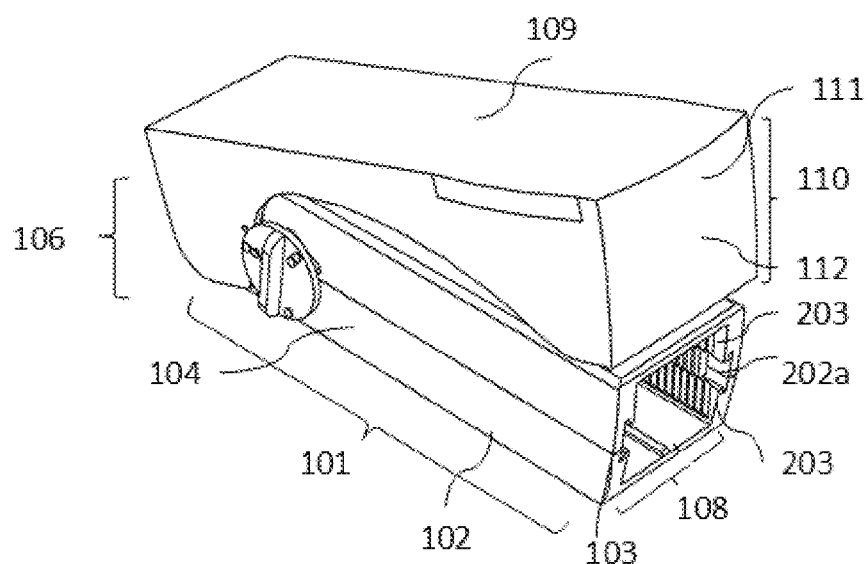
FIG. 14 is a perspective view of a third embodiment of the present invention with the lid in an open position that uses an alternative ratchet advance mechanism configuration and pawl location.

FIG. 14 is a perspective view of a third embodiment of the present invention with the lid 109 in an open position that uses an alternative configuration of the ratchet advance mechanism 202a-e and an alternative location of the second pawl 204. In this configuration the moveable toothed rack 202a and two stationary toothed racks 203 are mounted along the sidewall 104 of the food holder 101. However, it is expressly contemplated that any number of moveable toothed racks 202a and stationary toothed racks 203 may be mounted along the sidewalls 104 of the food holder 101.

FIG. 15 is a cut away perspective view of the embodiment shown in FIG. 14 as the lid 109 moves towards the closed position. In this embodiment, the second pawl 204 is mounted on the same side of the advancer 201 as the first pawl 202b. The stationary toothed rack 203 and the moveable toothed rack 202a are both mounted along the sidewall 104 of the food holder 101. The ratchet advance mechanism 202a-e includes a link 1501 with a first rotary joint 1502 and a second rotary joint 1503 where the first rotary joint 1502 is coupled to the lid 109 and the link 1501 and the second rotary joint 1503 is coupled to the link 1501 and the moveable toothed rack 202a. The second rotary joint 1503 contains a slot to allow motion of the lid 109 prior to the movement of the link 1501 causing movement of the moveable toothed rack 202a so that the lid 109 can move past the dispensing opening 108 before the sliceable item of food 107 is advanced through the dispensing opening 108.

FIG. 16A and FIG. 16B are close up isometric views of the embodiment of FIG. 1 showing the increment adjuster 1601 placed in distinct positions 1602A-E on the food holder 101 to interrupt the path of motion of the lid 109. In FIG. 16A the embodiment shows five distinct position options 1602A-E with the increment adjuster 1601 set to the third position and in FIG. 16B the increment adjuster 1601 is moved to the fifth position 1602E. Each distinct position 1602 results in the increment adjuster 1601 acting on the lid sidewall 1603 in a distinct location, allowing the lid 109 to open a distinct amount and resulting in a different thickness of the sliceable item of food 107 dispensed. In this embodiment the position of the increment adjuster 1601 is achieved by sliding the increment adjuster 1601 along a longitudinal axis on the sidewall 104 of the food holder 101. While this is an example of one embodiment, the increment adjuster 1601 can be located to engage with and resist motion of any member in the motion path of the lid 109 including but not limited to the lid 109, the food holder 101, and the moveable toothed rack 202a

Figure 17A:
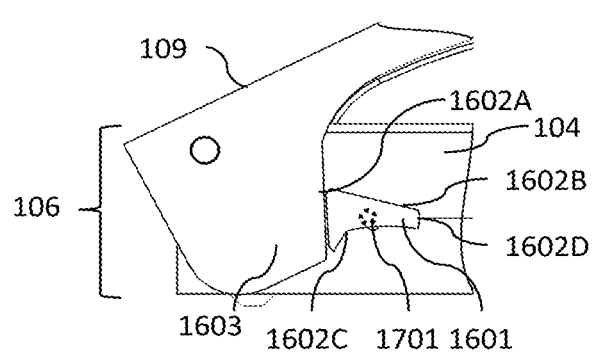
FIG. 17A and FIG. 17B are close up isometric views of the embodiment of FIG. 4 showing the increment adjuster placed in two unique positions on the food holder and interrupting the path of motion of the lid.
Figure 17B:
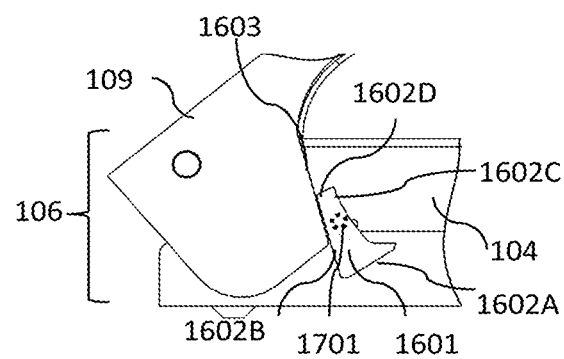

FIG. 17A and FIG. 17B are close up isometric views of the embodiment of FIG. 4 showing the increment adjuster 1601 placed in distinct positions 1602 on the food holder 101 to interrupt the path of motion of the lid 109. FIG. 17A shows four distinct position options 1602 with the increment adjuster 1601 set to the first position 1602A. In FIG. 16B the increment adjuster 1601 is moved to the second position 1602B. Each distinct position 1602 results in the increment adjuster 1601 acting on the lid sidewall 1603 in a distinct location, allowing the lid 109 to open a distinct amount and resulting in a different thickness of the sliceable item of food 107 dispensed. In this embodiment the position of the increment adjuster 1601 is achieved by rotating the increment adjuster 1601 around a rotation axis 1701 located on the increment adjuster 1601 mounted to the food holder 101.

Various embodiments of the present invention may be characterized by the potential claims listed in the paragraphs following this paragraph (and before the actual claims provided at the end of this application). These potential claims form a part of the written description of this application. Accordingly, subject matter of the following potential claims may be presented as actual claims in later proceedings involving this application or any application claiming priority based on this application. Inclusion of such potential claims should not be construed to mean that the actual claims do not cover the subject matter of the potential claims. Thus, a decision to not present these potential claims in later proceedings should not be construed as a donation of the subject matter to the public.

The embodiments of the invention described above are intended to be merely exemplary; numerous variations and modifications will be apparent to those skilled in the art. All such variations and modifications are intended to be within the scope of the present invention as defined in any appended claims.

What is claimed is:

1. A food storage and dispensing device comprising:
a food holder having (i) a bottom that includes a longitudinally disposed support surface, (ii) a pair of opposed side walls coupled to the bottom, and (iii) first and second ends, the holder configured to contain a sliceable item of food on the support surface and between the side walls, the food holder having a dispensing opening located at the first end, and the side walls defining a longitudinal axis parallel thereto;
a lid moveably mounted over the food holder so as to have an open position and a closed position;
an end cap, having an upper edge coupled to the lid at a location proximate to the first end, the end cap oriented to cover the dispensing opening when the lid is in the closed position, and having a lower edge opposite the upper edge, the lower edge configured to slice the sliceable item of food when the lid is moved from the open position to the closed position;
an advancer, slidably mounted in the food holder to move longitudinally along the food holder, and configured to engage against the sliceable item of food; and
a ratchet advance mechanism having a plurality of rigid components, coupled to the lid and to the advancer, and configured to incrementally move the advancer, and consequently the sliceable item of food, towards the dispensing opening each time the lid is moved to the open position from the closed position,
wherein the ratchet advance mechanism comprises a movable toothed rack coupled to the lid, longitudinally disposed in the food holder, and a first pawl disposed on the advancer, the movable toothed rack positioned to engage against the first pawl, the lid configured to advance the movable toothed rack and the advancer toward the dispensing opening when the lid is moved to the open position from the closed position, and to retract the movable toothed rack from the dispensing opening when the lid is moved to the closed position.

2. The device according to claim 1, wherein the ratchet advance mechanism further comprises a stationary toothed rack, longitudinally disposed in the food holder, and a second pawl disposed on the advancer, the stationary toothed rack configured to restrain the advancer from motion when the lid is moved to the closed position and to permit motion of the advancer when the lid is moved to the open position.

3. The device according to claim 2, wherein the second pawl is the same pawl as the first pawl, and the stationary toothed rack and the movable toothed rack are mounted so that both racks engage with the first pawl.

4. The device according to claim 2, wherein a member, selected from the group consisting of the movable toothed rack and the stationary toothed rack and a combination thereof, in a cross sectional view orthogonal to the longitudinal axis, is bowed toward the sliceable item of food so as to create a compressive force orthogonal to the longitudinal axis on the sliceable item of food to reduce a risk that the sliceable item of food would fall out of the food holder.

5. The device according to claim 1, wherein the ratchet advance mechanism is configured to act upon the advancer after the end cap has moved past the dispensing opening.

6. The food storage and dispensing device comprising:
- a food holder having (i) a bottom that includes a longitudinally disposed support surface, (ii) a pair of opposed side walls coupled to the bottom, and (iii) first and second ends, the holder configured to contain a sliceable item of food on the support surface and between the side walls, the food holder having a dispensing opening located at the first end, and the side walls defining a longitudinal axis parallel thereto;
- a lid moveably mounted over the food holder so as to have an open position and a closed position;
- an end cap, having an upper edge coupled to the lid at a location proximate to the first end, the end cap oriented to cover the dispensing opening when the lid is in the closed position, and having a lower edge opposite the upper edge, the lower edge configured to slice the sliceable item of food when the lid is moved from the open position to the closed position;
- an advancer, slidably mounted in the food holder to move longitudinally along the food holder, and configured to engage against the sliceable item of food;
- a ratchet advance mechanism having a plurality of rigid components, coupled to the lid and to the advancer, and configured to incrementally move the advancer, and consequently the sliceable item of food, towards the dispensing opening each time the lid is moved to the open position from the closed position; and
- an increment adjuster, mounted to occupy any of a plurality of distinct positions on a member selected from the group consisting of the lid, the food holder, and the ratchet advance mechanism, wherein each position of the increment adjuster causes an interruption in the path of motion of the lid, as the lid is moved from the closed to the open position, by a different incremental amount so as to regulate advance of the sliceable item of food through the dispensing opening and therefore thickness of a resulting slice.

* * * * *